Figure 1:
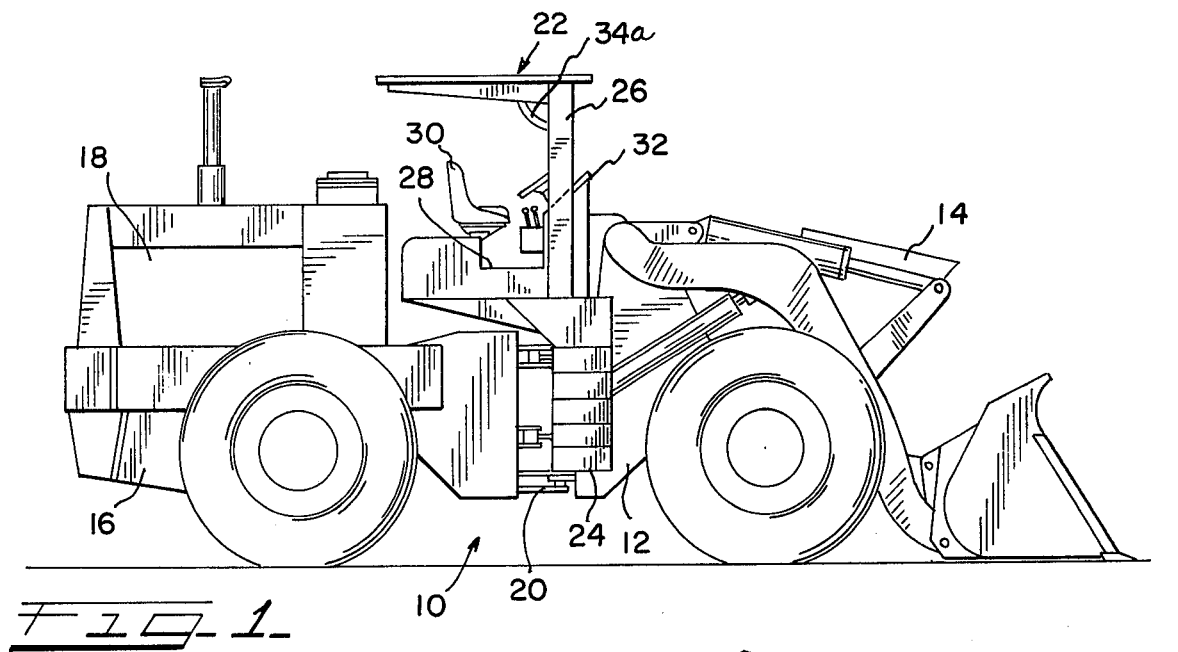

United States Patent [19]

Matalonis et al.

[11] 4,023,827
[45] May 17, 1977

[54] OPERATOR POSITIONING GRAB HANDLES

[75] Inventors: Charles V. Matalonis, Brookfield; Edward A. Bott, Crystal Lake, both of Ill.

[73] Assignee: International Harvester Company, Chicago, Ill.

[22] Filed: Dec. 8, 1975

[21] Appl. No.: 638,733

Related U.S. Application Data

[63] Continuation of Ser. No. 507,039, Sept. 16, 1974, abandoned.

[52] U.S. Cl. .............................. 280/756; 16/110 R; 296/71
[51] Int. Cl.² ......................................... B60N 3/02
[58] Field of Search .................. 296/71, 102, 28 C; 280/756, 163, 164 R; 214/DIG. 7; 16/110 R, 111 R, 113, 125

[56] References Cited

UNITED STATES PATENTS

| | | | |
|---|---|---|---|
| 264,240 | 9/1882 | Callaway | 296/71 |
| 296,090 | 4/1884 | Warren | 296/102 |
| 2,148,308 | 2/1939 | Spear | 296/28 C |
| 2,877,858 | 3/1959 | Knight | 280/163 |
| 3,127,214 | 3/1964 | Kettler | 296/102 |
| 3,145,050 | 8/1964 | Edwards | 297/183 |
| 3,203,728 | 8/1965 | Wood | 296/102 |
| 3,549,170 | 12/1970 | Shankwitz | 280/756 |
| 3,599,813 | 4/1970 | Totz | 280/756 |
| 3,791,668 | 2/1974 | Adams | 280/756 |
| 3,829,121 | 8/1974 | Ahrendt | 296/102 |

FOREIGN PATENTS OR APPLICATIONS

| | | | |
|---|---|---|---|
| 225,047 | 5/1962 | Austria | 296/102 |
| 1,940,422 | 2/1971 | Germany | 296/102 |
| 939,110 | 10/1963 | United Kingdom | 296/28 C |

Primary Examiner—Joseph F. Peters, Jr.
Assistant Examiner—David M. Mitchell
Attorney, Agent, or Firm—William H. Wendell; Floyd B. Harman

[57] ABSTRACT

Grab handles positioned above and slightly in front of the operator's seat. The handles each having a major plane, which intercept behind the operator's seat. Each handle is secured to the roll-over protective structure or frame work of the cab.

4 Claims, 2 Drawing Figures

U.S. Patent

May 17, 1977

4,023,827

OPERATOR POSITIONING GRAB HANDLES

This is a continuation of application Ser. No. 507,039, filed Sept. 16, 1974, now abandoned.

This invention relates to an operator's environmental structure for articulated vehicles and more particularly to interior grab handles to facilitate the movement of the operator with regard to the seat.

As the size of rubber tire articulated loader vehicles increase, it becomes more and more difficult for the operator to reach the operator's environmental station. The environmental station itself has been moved further back such that it is over as well as often behind the pivot point between the two sections of the vehicle. This creates difficulties in providing a suitable ladder means for climbing up to the operator's station and thereafter because of the reduced size of the station and increased instrumentation actually achieving positionment in the operator's seat. Exterior grab handles are often provided on the ladder leading to the operator's station as well as therearound. These handles are designed to facilitate the operator in gaining the operator's station. It is thereafter necessary for him to locate himself in the operator's seat. Because such vehicles are provided with power steering the steering wheel is freely rotatable and thus does not provide any good support. Further, if the vehicle were running such movement of the steering would articulate the machine. The same can be said for hydraulic levers which actuate various functions of the vehicle. They are for the most part not designed to function as grab handles and if they are used as such could cause inadvertent actuation of the vehicle or break or bend etc.

The operator's station itself normally has some sort of safety steel flooring and a cab structure over that or a roll-over protective structure. As is apparent in wet, muddy conditions the operator's boots become covered with material which often acts as a lubricant and for the most part such structures do not offer any type of hand holds once he has reached the operator's station. In the situation where the operator's station is covered by a roll-over protective structure, the operator, if he loses his balance, can often fall a substantial distance to the ground. Once the operator has positioned himself in the operator's seat he must be able to extract himself therefrom under conditions where the steel deck is slippery and wet. The operator is dressed in clothes which are combersome. He has heavy gloves on his hands which cut down on his manual dexterity and mud on his boots. All of these conditions being standard on a construction site in the northern hemisphere.

It is therefore an object of this invention to provide interior grab handles to facilitate the operator in maneuvering in and out of the operator's seat of a vehicle. Another object of this invention is to provide interior grab handles which do not interfere with movement of the operator to or from the operator's station. It is still another object of this invention to provide an operator's station having a steel deck and grab handles which are situated such that the operator can lift himself substantially vertically from the seat without causing slippage of his feet on the deck. It is yet another object of this invention to provide an operator's station having an operator's seat with interior grab handles located above and slightly in front thereof, and being angled to fit the grasp of the operator.

In accordance with the invention grab handles have been provided in an operator's station designed for use on a vehicle. The station is accessible via a ladder and exterior grab handles are provided such that the operator can gain access to the floor or deck of the operator's station. Once such access is gained, interior grab handles are provided, specifically located, such that the operator with the minimum amount of opportunity for slippage between his feet and the deck can position himself in the operator's seat. The interior grab handles are located above and slightly in front of the operator's seat whereby he can from the seat, reach upwardly and grasp them and literally lift himself in and out of the seat into a standing position with minimal use of leg generated forces.

Figure 2:
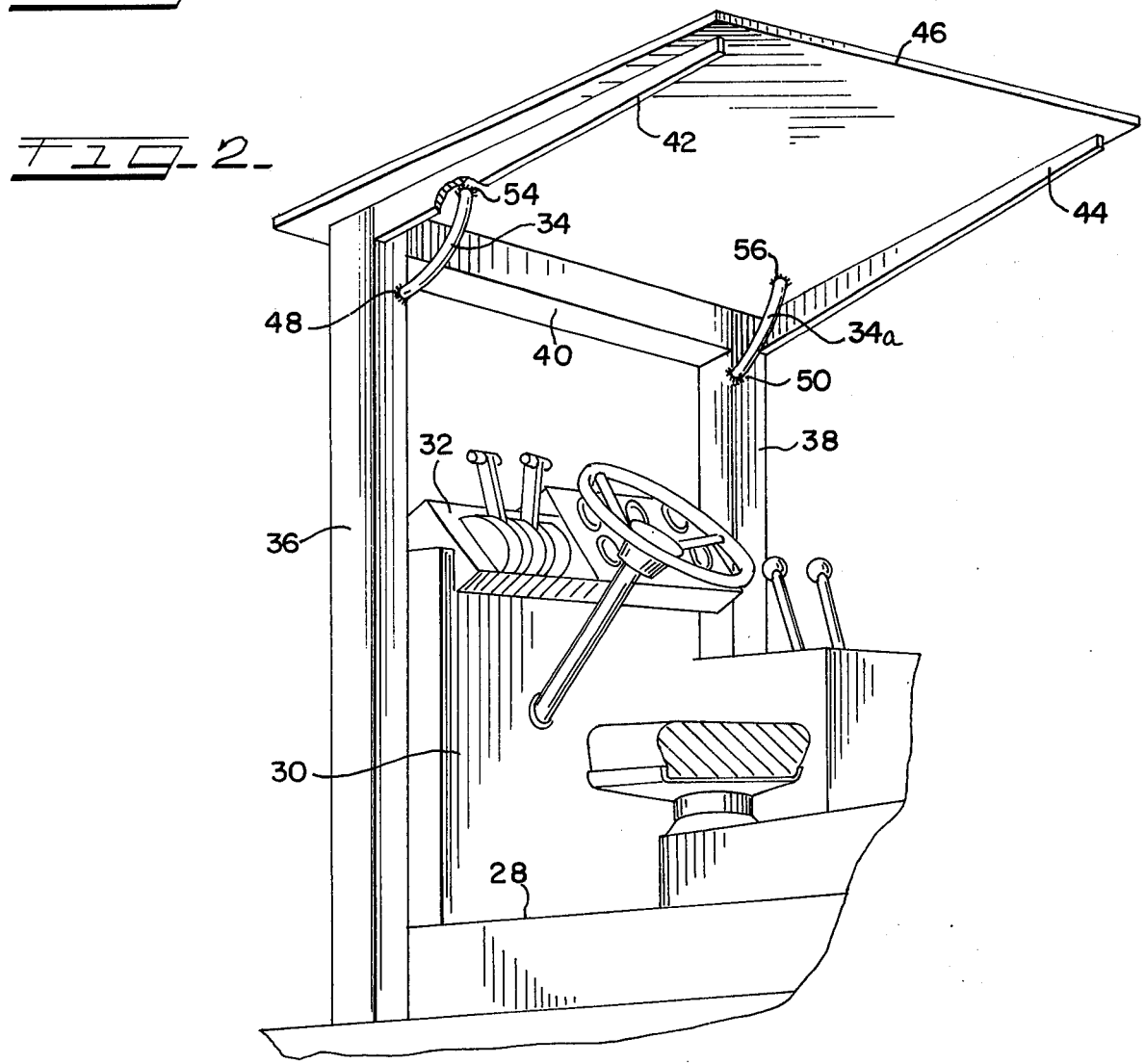

Other objects and advantages of the invention will become apparent upon reading the following detailed description and upon reference to the drawings, in which:

FIG. 1 is a side view of an articulated loader vehicle showing the operator's station situated above and behind the pivot point of the vehicle and illustrating the difficulty of access thereto; and FIG. 2 is a partial rear view of a roll-over protective structure showing the location of the interior grab handles.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

Turning now to FIG. 1, there is shown an articulated loader vehicle means 10 including the front section means 12 mounting the bucket assembly means 14 and the rear driving means 16 carrying the engine means 18. The front and rear sections pivot around articulated pivot point means 20. The operator's station 22 is shown located above and slightly behind the pivot point 20. Ladder and grab handle means 24 are provided such that the operator can gain access to the environmental station means 22. The operator's environmental structure can be either a cab means, a falling-objects protective structure (FOPS) means, or as shown in FIG. 1 a roll-over protective structure 26 with FOPS canapy. Also included is the deck means 28 normally being steel sheet with safety lugs therein, and operator's seat 30 and the dash means 32 including the steering wheel and vehicle function actuation levers. Located in the corners of the roll-over protective structure are the interior grab handle means 34 as will hereinafter be more fully explained.

Referring now to FIG. 2 the roll-over protective structure means 26 is more fully discussed. Structures of this nature consist basically of two vertically extending support beams 36 and 38 spaced from each other and secured at their lower ends to the frame of the vehicle. The upper ends thereof are interconnected by a cross beam means 40 transversely extending therebetween. A set of longitudinally extending support beams 42 and 44 are secured to the vertically extending support means 36 and 38 and extend away therefrom to provide support for a roof means 46. The dash means 32 is normally situated between the vertical support means 36 and 38. Such roll-over protective structures are well known in the art as is their relationship in the entire operator environmental protective structure.

However, the unitary design of the roll-over protective structure means 26 should be noted with the very definite lack of hand holds as well as other points which would provide a secure grip for an operator moving himself around on the steel deck means 28.

The grab handle means 34 and 34a depend from the upper portions of the roll-over protective structure and are welded or otherwise suitably fixed directly thereto. The grab handles themselves are oblique semicircular sections formed in the preferred embodiment from a steel rod or pipe of a diameter to facilitate gripping by the human hand even when said hand is encombered by a glove. The grab handle means 34 and 34a have first ends 48 and 50 welded to the support post means. The second ends 54 and 56 are welded to the roof structure 46 such that the major plane struck out by the oblique semi-circles angle toward each other and intersect at a line generally behind the operator's seat.

The positioning of the grab handle means 34 and 34a in regard to the seat is critical. That is, the operator must be able to reach from a sitting position and grasp them and yet when moving to and fro on the steel deck 28 they must not interfere with free movement of his head.

In operation the operator would climb the ladder means 24 employing the external grab handles until he is standing on the steel deck means 28. Thereafter with one hand he would reach over and grasp the nearest grab handle and maneuver himself between the seat means 30 and the dash means 32 to a position where he can lower himself into the seat. All of these motions being performed without any horizontal forces being generated between his feet and the deck means. When the operator wants to remove himself from the operator's station he need only reach upwardly grabbing one handle in each hand and raise himself with his arms in a generally vertical direction such that only minimum horizontal forces are generated between his feet and the deck. As is apparent such horizontal forces if exerted on a wet, muddy deck surface could result in the slipping and falling of the operator's from the operator's environmental station.

It is thus apparent that the invention provides a grab handle means located within the operator protective structure, which it should be noted may be a roll-over protective structure, a falling object protective structure, or a cab means. The particular design of the grab handle is not critical, however, it is important that they are positioned above and generally in front of the operator such that he can lift himself with basically his arm muscles in a generally vertical direction. Such an action allows him to employ a minimal amount of leg forces. In adverse weather conditions the deck of the protective structure may become slippery etc. such that the operator could slide while attempting to stand. The grab handles are positioned so that the operator can swing into the protective structure either from the right or from the left side and are also situated such that they can be reached when the operator is in a seated position.

What is claimed is:

1. A tractor having an operator's station including a deck, an overhead protective structure steering and control levers, an operator's seat centrally located, and a ladder secured to said vehicle extending upwardly to said operator's station wherein the improvement comprises: at least two interior grab handles secured to said protective structure above and slightly in front of said seat and lying within major planes angled toward each other and intersecting behind said seat for grasping by an operator while maneuvering himself generally vertically with regard to said seat with minimal leg effort.

2. The tractor of claim 1 wherein said interior grab handles are generally semi-circular section rods secured to and extending downwardly from said protective structure.

3. The tractor of claim 2 wherein a vertical air space is above said ladder and one of said rods is adjacent said air space.

4. An articulated vehicle having an operator's station located generally above and behind the pivot point of said vehicle and including a deck, an overhead protective structure, a steering and control lever arrangement, an operator's seat centrally located, and a ladder secured to said vehicle extending upwardly to said operator's station wherein the improvement comprises:

first and second spaced apart semi-circular section means, having first ends secured to said protective structure above and slightly in front of said seat and having second ends secured to said protective structure below and forward of said first ends, said section means extending downwardly and away from each other for grasping by an operator while maneuvering himself generally vertically with regard to said seat with minimal leg effort.

* * * * *